C. W. GIRVIN.
DIRECT CURRENT MECHANISM.
APPLICATION FILED MAR. 11, 1912.

1,196,773.

Patented Sept. 5, 1916.
5 SHEETS—SHEET 2.

WITNESSES

INVENTOR
Chas. W. Girvin
by T. T. Bryant Attorney.

C. W. GIRVIN.
DIRECT CURRENT MECHANISM.
APPLICATION FILED MAR. 11, 1912.

1,196,773.

Patented Sept. 5, 1916.
5 SHEETS—SHEET 3.

WITNESSES

INVENTOR
Chas. W. Girvin
by T. K. Bryant Attorney

C. W. GIRVIN.
DIRECT CURRENT MECHANISM.
APPLICATION FILED MAR. 11, 1912.

1,196,773.

Patented Sept. 5, 1916.
5 SHEETS—SHEET 4.

WITNESSES

INVENTOR
Chas. W. Girvin
by T. J. Bryant Attorney.

C. W. GIRVIN.
DIRECT CURRENT MECHANISM.
APPLICATION FILED MAR. 11, 1912.

1,196,773.

Patented Sept. 5, 1916.
5 SHEETS—SHEET 5.

WITNESSES
M. E. Lowry
L. W. Anderson

INVENTOR
Chas. W. Girvin
by T. S. Bryant Attorney.

UNITED STATES PATENT OFFICE.

CHARLES W. GIRVIN, OF SAN FRANCISCO, CALIFORNIA, ASSIGNOR TO GIRVIN ELECTRICAL DEVELOPMENT COMPANY, LIMITED, OF HONOLULU, TERRITORY OF HAWAII, A CORPORATION OF THE TERRITORY OF HAWAII.

DIRECT-CURRENT MECHANISM.

1,196,773.  Specification of Letters Patent.  Patented Sept. 5, 1916.

Application filed March 11, 1912. Serial No. 683,065.

*To all whom it may concern:*

Be it known that I, CHARLES W. GIRVIN, a citizen of the United States, and residing at San Francisco, in the county of San Francisco and State of California, have invented certain new and useful Improvements in Direct-Current Mechanism of which the following is a specification.

My invention relates to direct current mechanism adapted to produce or employ current of high potential, and provides for either the production or employment of direct current of a voltage exceeding that heretofore known for this type of current, this result being obtained by the arrangement of the elements in such manner as to practically obviate flashing at the commutator, one of the main difficulties in the production or employment of high voltage direct currents, and also to reduce difficulties in the insulation of the armature windings.

So far as I am aware the production or employment of direct currents has been limited to a low potential as compared with alternating currents; the present invention is designed to change this condition so as to raise the direct current potential into a favorable comparison with that of alternating currents within the limits of a unitary structure. For instance, the known commercial mechanism is limited to approximately 5,000 volts, while special mechanisms have been designed which may reach as high as 25,000 volts, this latter representing the limits of production or employment in a single unitary structure; the invention disclosed herein is designed to produce or employ direct currents of high potential far exceeding these known mechanisms. This result is obtained by the employment of a commutating direct current apparatus having a plurality of open circuit coil units connected up through the commutator so as to maintain the units constantly in circuit and constantly in series relationship, the units structurally being of the open-coil type, but operating similarly to the ordinary "closed-coil" type of direct current mechanism, different from the known "open-coil" mechanisms in that the latter have their separate windings in circuit only while at or near their maximum E. M. F., being put into or cut out of circuit at other times, as by being thrown into parallel relation with at least one other winding and rendering a portion of the windings inactive with respective to the external circuit, dependent upon the position of the windings, while in the mechanism herein disclosed, no coil unit is cut out of circuit and the series relationship between adjacent units is constant.

The arrangement of the coil units may be in the form of a single series circuit or a plurality of such circuits, the circuits in the latter case being capable of being employed either in series or in parallel relationship or a combination of both, but in either event, the commutation is such that each circuit has its coil units constantly in series relationship and constantly active when the units are in service.

The principal object of my invention is therefore to provide a mechanism in which the E. M. F. produced by a coil unit is constantly added to the circuit and the E. M. F. of all of the units which may be in that circuit have a similar relation to the circuit by being permanently connected in series with each other and constantly in service.

A further object is to provide a mechanism in which the coil units referred to, either as a whole or as a group, collectively provide a constant series relationship with respect to each other but in which any or all of the units may be formed of a plurality of conductors which may be in series or in parallel relationship or a combination of both, to permit of variations in the voltage resulting from the series relationship of the coil units collectively.

A still further object is to provide a mechanism which can be employed either as a generator or as a motor for the production of or employment with direct current of high potential, the mechanism being adapted to act as a step down mechanism.

A further object is to provide a mechanism in which the conductors of a coil unit may be employed either in series, in parallel, or a combination of both, the coil unit as an entirety, however, being in permanent series relationship with the remaining coil units of the group forming the particular circuit, to provide for controlling the voltage of the circuit.

Other objects, and the provision of specific means and structures for producing the results heretofore indicated, will be readily perceived and understood as the invention is hereinafter disclosed.

To these and other ends, the nature of which will be readily understood as the invention is hereinafter disclosed, said invention consists in the improved construction and combination of parts hereinafter fully described, illustrated in the accompanying drawings, and more particularly pointed out in the appended claims.

In my invention, revolving field magnets are employed and these may be of the ordinary type with exciting coils on each pole, the coils being supplied with current through collector rings, or the revolving field magnets may be of the inductor type with one large stationary annular coil exciting all of the poles. In either case the current for the excitation of the fields may be derived either from certain of the armature sections of the machine itself or from an outside source.

In the drawings forming a part of this application and in which like numerals of reference designate corresponding parts throughout the several views.

My invention broadly consists in generating a multiplicity of phases of alternating currents each in a separate coil or circuit of coils in a stationary armature, and by means of a particular type of commutator as hereinafter described, the phases are separately rectified and united into a direct current. The advantage in generating the phases directly in a stationary armature rather than deriving them from an alternating current system by means of transformers is that interpoles or other compensating windings may be used in the field to assist the reversal of current in the phase circuits.

For the purpose of describing the present invention, it is considered as a generator of direct current, but it will be understood that the mechanism, like the general type of mechanisms of this character, may operate either as a generator or as a motor, and the mechanism herein disclosed is adapted to act as either.

I preferably employ a rotating field of any desired number of poles and a stationary armature; the latter being provided with a plurality of coil units of the open circuit type, each unit having each of the terminals in the form of a brush adapted to coöperate with the commutator. In the drawings, I have shown the coil units at $a$, $b$, $c$, $d$, etc., these units being independent of each other, the brushes of the coil units being indicated at 1, 2, 3, 4, etc., as the disclosure is that of sixteen coil units, the unit characters run from $a$ to $p$ and the brush characters from 1 to 32. The brushes are held in suitable insulated holders and arranged in a row or rows longitudinally of and parallel to the axis of a commutator to be described later. The two brushes for each coil unit are adjacent to each other in the same row, as, 1 and 2 are the brushes connected to coil unit $a$ and are adjacent to each other in the same row. The two brushes for the adjacent coil unit are in the same row and adjacent to the first two brushes, as, coil unit $b$ is adjacent to coil unit $a$ in the armature and its brushes 3 and 4, are adjacent to those (1 and 2) of coil unit $a$. This arrangement is followed for as many coil units and brushes as desired to operate in one row, the remainder being arranged in a separate row or rows.

Figure 1:
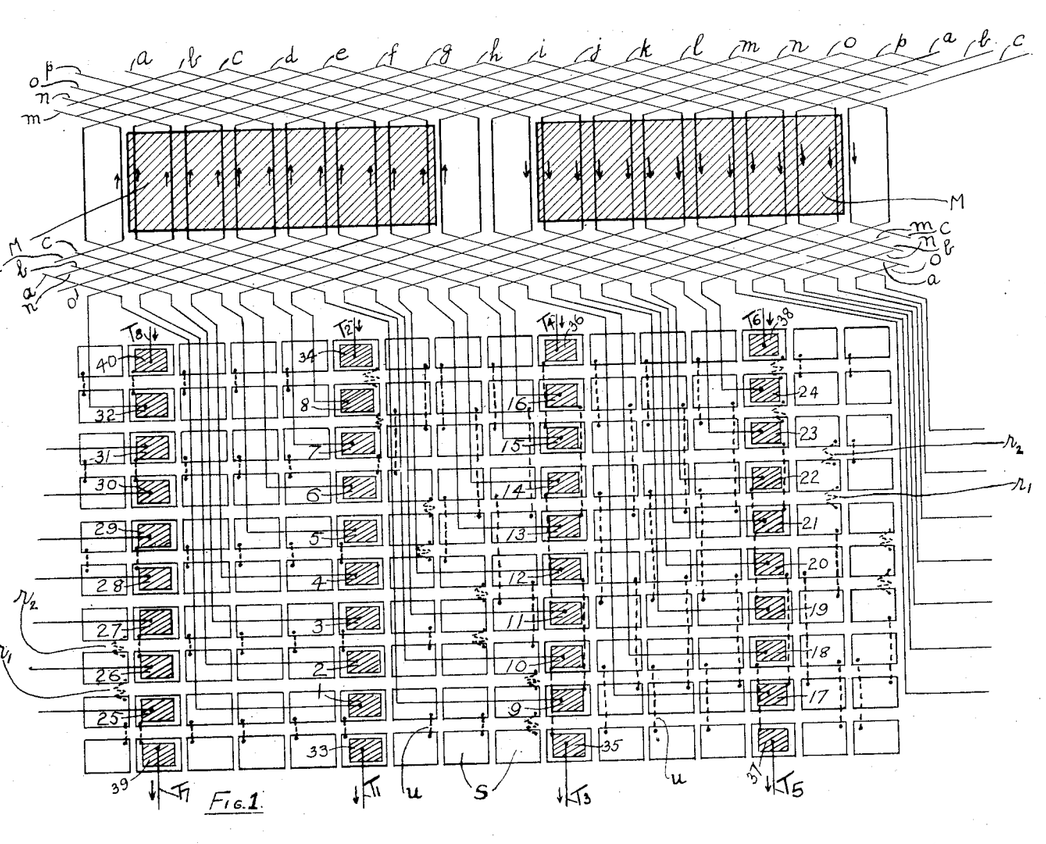
Figure 1 is a diagrammatic development on a plane surface of a commutator, fields, windings, and brushes assembled as devised by me.
Figure 2:
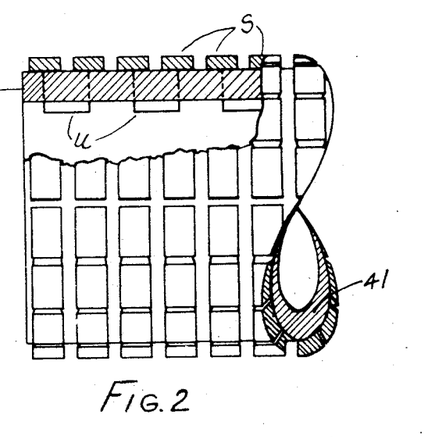
Fig. 2 is a side elevation partly broken away of a commutator construction that may be employed.
Figure 3:
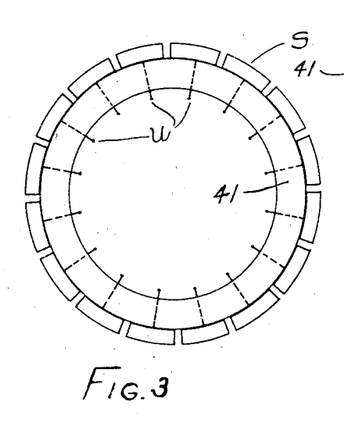
Fig. 3 is an end view of the commutator.
Figure 10:
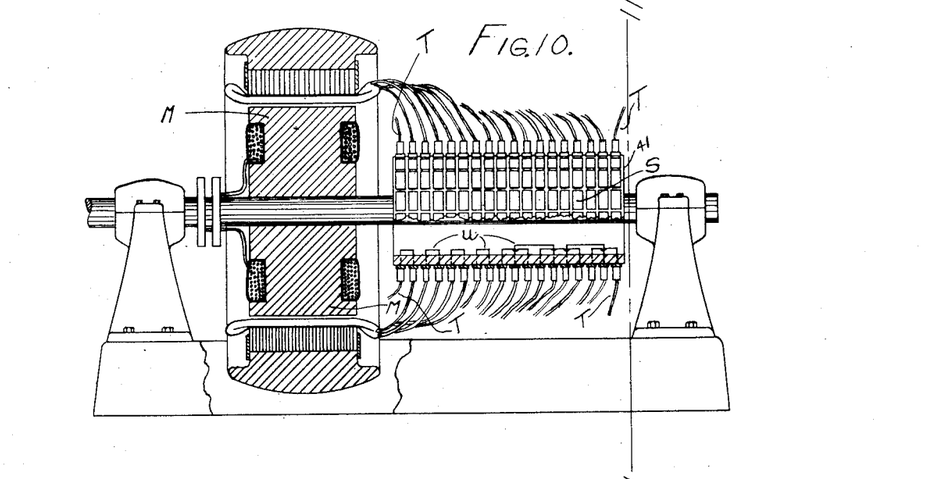
Fig. 10 is a side elevation partly in section of a stationary armature machine illustrating one arrangement of elements for employing my commutator, only two sets of brushes being employed.
Figure 11:
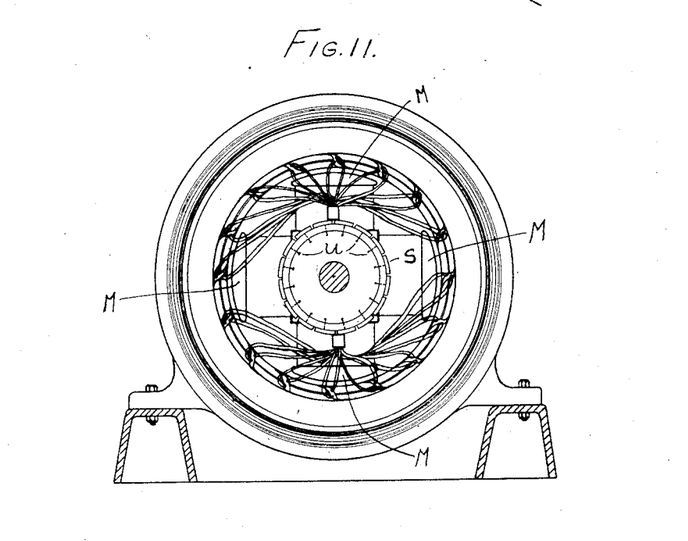
Fig. 11 is a vertical transverse sectional view of the device taken on line 11—11 of Fig. 10.

In Fig. 1, I have shown diagrammatically in the form of a plane surface, a bi-polar field, an armature having sixteen coil units arranged in four groups of four units each, the groups being represented by the four lines of brushes, and the commutator segments being arranged for successive commutations. As will be seen, the brushes of a group contact with a row of segments, the particular positions on the rows on the segments indicating the positions of the coil units of the several groups with respect to the poles, a shifting of the commutator, as in operation, necessarily causing the segments to be successively traversed by the brushes. This view indicates the various connections of segments of a row by means of which the brushes remain in series relationship although the direction of E. M. F. in the armature coil units changes during the rotation of the field, the inflow and outflow of current in the circuit which includes the units of a group always being in the uniform direction indicated. The particular showing of this view is such that the direction of flow of E. M. F. in the several coil units which are connected through the connections U may be readily traced for any position of the fields M and commutator 41 which move in synchronism. This view may also be considered as showing successive positions of a single row of brushes, the mechanism herein described being such that more than a single row of brushes may be employed on the same commutator section, these rows being spaced apart around the periphery of the commutator a distance sufficient to practically eliminate flashing, it being understood, of course, that each row forms an independent group which can be treated as a separate circuit or which can be connected up to the group provided by an adjacent row either in series or in parallel, each row having its commutating action entirely independent of the remaining row or rows of the same commutator section. In Figs. 10 and 11, two groups of eight coil units each are shown as employing two rows of brushes, thus forming two independent groups. At each end of each row of coil unit brushes is placed another brush; (33, 34; 35, 36; 37, 38), these being the brushes from which is conducted the current from the respective groups of coil units. Thus 33 and 34 are the terminal brushes for the group of units $a$, $b$, $c$, and $d$; 35 and 36 are the terminal brushes for the group of units $e$, $f$, $g$, and $h$.

The commutator consists of a cylinder 41 of some mechanically strong dielectric substance such as compressed fiber or other suitable material.

S—S are metallic contacts or segments mounted on the cylinder 41 by screws or bolts or other suitable methods.

U—U are connecting wires joining segments as hereinafter described.

In each of Figs. 4 to 9 both inclusive, $a$, $b$, $c$, and $d$ are diagrammatic representations of the coil units $a$, $b$, $c$, and $d$ of the armature. 1, 2, 3, 4, 5, 6, 7, and 8 are the respective brushes for the units as before described arranged in a row parallel to the axis. 33 and 34 are the terminal brushes for this group. $T_2$ $T_1$ are terminal wires connected to brushes 34 and 33 respectively.

Figure 5:
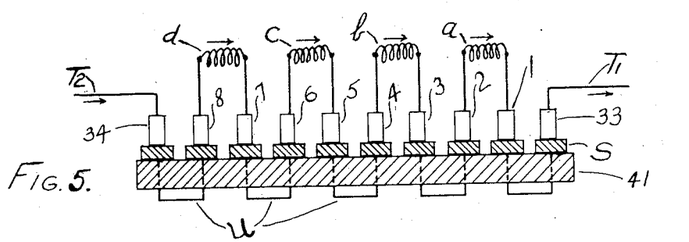
Figure 6:
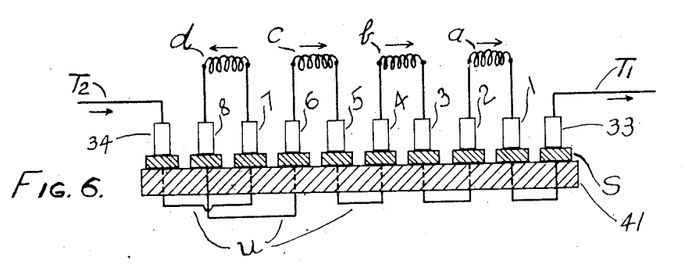

Fig. 5 shows the path of current flow when a group of units is opposite the pole shown at the left in Fig. 1, this position corresponding to the position of the brushes 25 to 32 in said Fig. 1, and this path is preserved while all of the units of that group are opposite the pole or within its influence; as shown in said Fig. 1, any number of rows of segments may be similarly connected, said view showing the three succeeding rows as having the same form of connections U, thus providing for the passage of the coil units through the sphere of influence of a pole. In Fig. 5, it will be seen that the current enters at $T^2$, passes through each coil in a direction corresponding to the direction of the E. M. F., in that coil and finally passes out at $T^1$.

Figure 4:
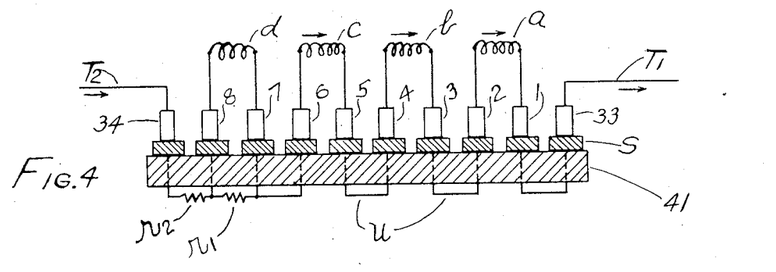
Figs. 4 to 9 inclusive are views partly diagrammatic illustrating the method of individually commutating a plurality of coil units while maintaining each constantly in series relationship with the others and all with the external circuit, Figs. 5 to 9 illustrating successive commutations, Fig. 4 indicating a way in which resistance may be used to aid commutation of the currents in the coil units.
Figure 7:
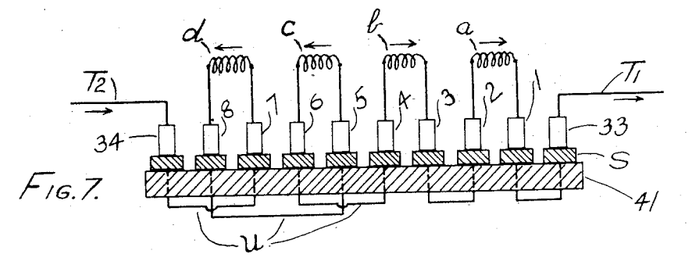
Figure 8:
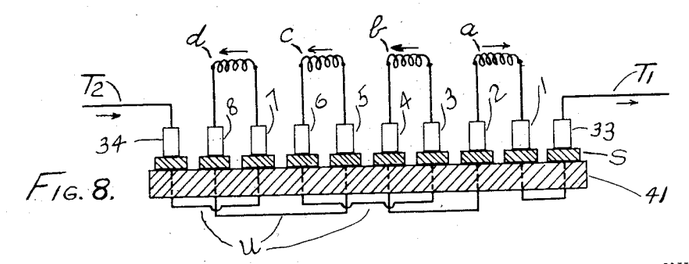
Figure 9:
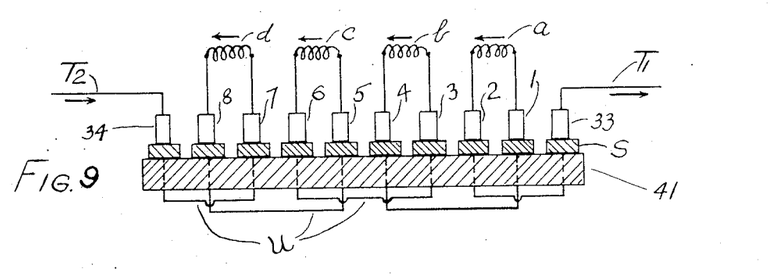

As in mechanisms of the closed coil, direct current type, the reversing in polarity of a coil unit provides a temporary short circuit of that coil unit, and to meet this condition, I may if necessary, employ resistance in the connections U, such for instance, as shown at $r'$ and $r^2$, in Fig. 4, the values of which need be but small, and where commutating poles are used, may be reduced to a negligible value. The path of current flow during this short circuit period is indicated in Fig. 4 in connection with coil unit —$d$—, and this position is shown in Fig. 1 in connection with the position of the brushes indicated as 1 to 8. As will be obvious, the position of Fig. 6 follows that of Fig. 5, this latter figure showing the coil unit —$d$— as having been reversed in polarity, the connections U at this stage shifting the path of current flow from brush 34 to brush 7 instead of to brush 8 as in Fig. 5, brush 8 being connected in series with brush 6 instead of this connection being provided from brush 7 as in Fig. 5, the remaining coil units retaining their previous arrangement of connections; consequently, the series relationship is still preserved with the coil unit —$d$— forming part of the circuit although it has passed into a field of opposite magnetic polarity. As the succeeding unit reverses its polarity, the connections of the segments change the course of the current path to that shown in Fig. 7, in which the unit —$c$— is shown as having been reversed, it being understood that the short circuiting operation takes place between the positions of Fig. 6 and Fig. 7, the resistances $r'$ and $r^2$ operating in connection with the brushes 5 and 6, as shown in the row of segments succeeding the row carrying the brushes 1 to 8 in Fig. 1. In Fig. 7, it will be seen that the path runs from brush 8 to brush 5 of the coil unit —$c$—, through brush 6 to brush 4, thus continuing the circuit activity of coil units —$c$— and —$d$— and retaining the series relationship of all of the units. Coil unit —$b$— then reverses its polarity and the commutator provides a positioning of the connections such as shown in Fig. 8, in which the brush 6 connects with brush 3 of unit —$b$—, instead of brush 4 of that unit, brush 4 in turn connecting with brush 2, thereby continuing units $b$, $c$, and $d$, in the circuit and retaining the series relationship of these units with —$a$—, although unit —$a$— has its direction of flow opposite that of the remaining units. In passing to this position, the short circuiting action is in connection with brushes 3 and 4.

The coil unit —a— is then reversed in polarity with the connections —u— arranged so that brush 4 of unit —b— is connected to brush 1 of unit —a—, brush 2 being connected with the terminal 33. In passing to this position, the short circuiting effect has been placed on brushes 1 and 2, and as will be seen by referring to Fig. 9, all of the units of this group have changed in polarity and are assumed to be within the influence of the opposing field. The series arrangement and continuity in circuit are retained although the direction of flow in each coil unit is opposite that shown in Fig. 5. The succeeding commutations provide a similar succession of reversals in the units, with the result that the path of flow is finally restored to that shown in Fig. 5. It will thus be seen that although each unit is subjected to the reversing operation, due to the change in polarity, the unit remains as an active part of the circuit and has the series relationship with the adjacent units maintained throughout the entire commutating operation, the result being that the voltage produced by the group is the sum of the voltages of the several units. The minimum number of coil units which may form a "group" is preferably a number corresponding to the number of coil units in a pole pitch, thus providing that the E. M. F. time values of the coil units of the group are in successive or sequential phase relationship and produce a substantially continuous E. M. F. It is not necessary, however, that the coil units employed in the group be taken from the same pole pitch, it being necessary only that the selected units have the proper E. M. F. time values to produce such successive phase relationship within the group, it being understood that all of the coil units have a definite phase relationship. Obviously a greater number of coil units may form a group.

Figures 12, 13, 14:
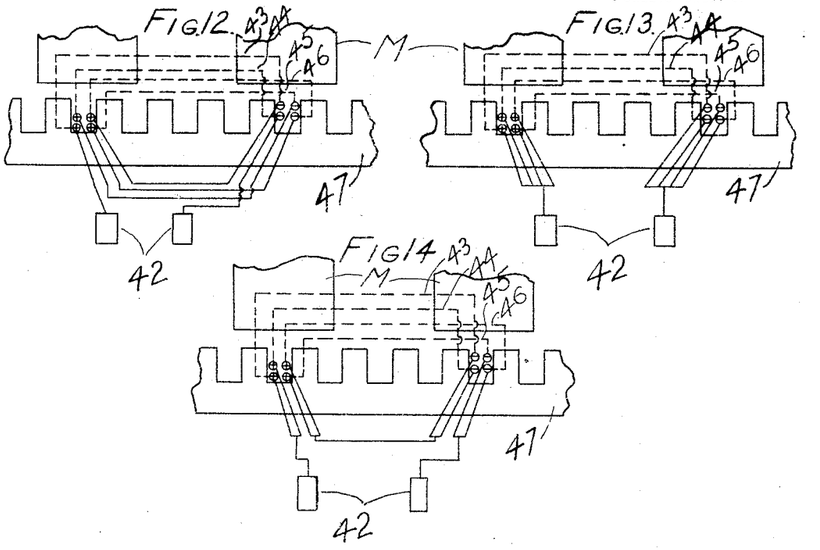
Figs. 12, 13 and 14 diagrammatically illustrate a coil sub-divided into four small coils and three manners of connecting up the small coils.

The several coil units may be formed in any suitable manner, as for instance, shown in Figs. 12, 13 and 14, in which each of the units is shown as being composed of a plurality of conductors, these conductors being arranged either in series or parallel relationship or a combination of both, and the arrangement of these conductors in this manner will enable variations in voltage of the group circuit to be provided, without, however, affecting the series relationship or the continuity of the group circuit; in Fig. 12, I have shown the conductors 43, 44, 45, and 46 as arranged in series, while in Fig. 13, they are shown as arranged in parallel, 42 indicating the terminal brushes of the unit; in Fig. 14, I have shown the conductors 43 and 44 as being in parallel, as are the conductors 45 and 46; the two sets of conductors, however, having a series connection. This arrangement of coil units provides for a speed control in a motor without using resistance or varying the supply voltage.

As heretofore stated, the brushes may be arranged in several parallel rows on the same commutator, but the tendency to flash from one row to the next, may make it preferable to change this arrangement where extremely high potential is desired, in which case, a single row of brushes, which may form a plurality of groups will prevent the flashing action. It will also be understood that the number of segments —s— of the commutator is optional and depends upon the action desired, it being obvious that the proper number to produce the desired result will be employed.

As will be obvious, the degree of pulsation in the direct current produced by my mechanism will depend upon the number of coil units per pole in the armature, the number of phases controlling in this respect as in the ordinary closed coil direct current generator. Obviously, the arrangement of the units in groups will enable a pre-determined number of the groups to operate the mechanism as a motor while the remaining groups may be employed to generate current, this arrangement enabling the device to act as a step-up or step-down mechanism for the voltage. It will also be understood that if desired, some of the units may be permanently connected together without using brushes, this arrangement giving the ordinary revolving field alternator construction.

It is obvious that the commutator or commutators may be on the same shaft with the field magnets as shown in Fig. 10 or on a separate shaft or shafts driven by gears, chains, or similar devices.

Figure 15:
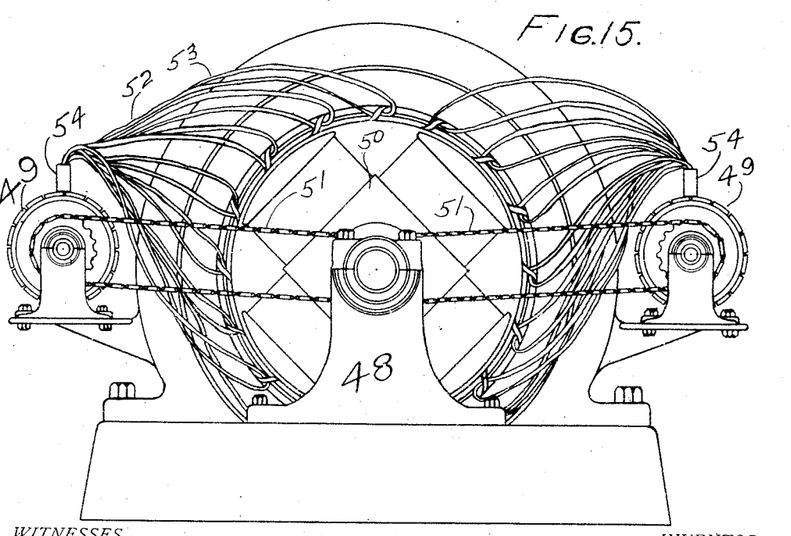
Fig. 15 is an end elevation of a machine employing two commutators.

In Fig. 15, a machine 48 similar to that shown in Fig. 10 is illustrated, employing therewith the separate commutators 49 positioned upon opposite sides thereof and operated in synchronism with the revolving field 50 by means of the sprocket chains 51. Therein is also shown two terminal leads 52 and 53 for each of the sixteen armature coil units, it being understood that each terminal lead is provided with an individual brush as hereinbefore described, although only the end brushes 54 of the row of brushes contacting each commutator 49 are to be seen in this end view of the machine.

It is obvious that each group of coils operated with their brushes in one row or upon one commutator is complete in itself and will furnish a direct current, the freedom from pulsation of which being dependent on the number of coils in the group. Thus each group may be used to supply a separate circuit or the groups may be connected in parallel or series with each other for various values of current or E. M. F. desired. Also it is obvious that current may be supplied to some of the groups to run the machine as a motor and the other groups used to generate current, thus using the machine as a step-down mechanism.

With these advantages and objects in view it is noted that while one form of apparatus, which is believed to be new, is herein shown and described, it is nevertheless to be understood that this invention is not limited thereto and changes may be made in the matter of form, proportion, size and minor details of construction without departing from the spirit and scope of the invention as set forth in the appended claims.

Having thus described my invention and in what manner the same is designed for use, what I claim as new and desire to secure by Letters Patent of the United States is:—

1. A direct current machine, comprising a plurality of independent open-circuited armature coil units, a brush for each terminal of each unit, a commutator, field magnets, a plurality of segments upon said commutator and interconnections between certain of said segments adapted to maintain the coil units in series and to connect predetermined ones of said brushes together during one portion of a revolution of the commutator.

2. A direct current machine of the constant potential type, comprising a plurality of independent stationary open-circuited armature coil units, a stationary brush for each terminal of each unit, a revolving commutator adjacent to said brushes, synchronously revolving field magnets, a plurality of segments upon said commutator, connectors positioned between said segments and adapted during one portion of a revolution of the commutator for connecting predetermined ones of said brushes together, and during another portion of the revolution reversing said last-named brushes in their relations to each other and to the remainder of the brushes.

3. A direct current machine of the constant potential type, comprising a plurality of independent stationary open-circuited armature coil units, a stationary brush for each terminal of each unit, a revolving commutator adjacent to said brushes, synchronously revolving field magnets, a plurality of segments upon said commutator, connectors positioned between said segments and adapted during one portion of a revolution of the commutator for connecting pre-determined ones of said brushes together, and during another portion of the revolution reversing said last-named brushes in their relations to each other and to the remainder of the brushes, said reversals of the brush connections occurring at the instant of reversal of the current in the respective coil units.

4. A direct current machine of the constant potential type, comprising a plurality of independent stationary open-circuited armature coil units, a stationary brush for each terminal of each unit, a revolving commutator adjacent to said brushes, synchronously revolving field magnets, a plurality of segments upon said commutators, connectors positioned between said segments and adapted during one portion of a revolution of the commutator for connecting predetermined ones of said brushes together, and during another portion of the revolution reversing said last-named brushes in their relations to each other and to the remainder of the brushes, said reversals of the brush connections occurring at the instant of reversal of the current in the respective coil units, interposed resistance elements joining those segments engaged by the brushes of a coil unit during reversal of said brushes and unit.

5. A direct current machine of the constant potential type, comprising a plurality of independent stationary open-circuited armature coil units, a stationary brush for each terminal of each coil, a revolving commutator adjacent to said brushes, synchronously revolving field magnets, a plurality of segments upon said commutator, connectors positioned between said segments and adapted during one portion of a revolution of the commutator for connecting pre-determined ones of said brushes together, and during another portion of the revolution reversing said last-named brushes in their relations to each other and to the remainder of the brushes, said reversals of the brush connections occurring at the instant of reversal of the current in the respective coil units, interposed resistance elements joining those segments engaged by the brushes of a coil unit during reversal of said brushes and unit, and adapted to short circuit the unit during reversal, preventing arcing, and producing a unidirectional non-pulsating current.

6. A direct current machine comprising a stationary armature, separated circuits upon said armature, a separate contact brush for each circuit terminal, a revolving shaft, a field magnet upon said shaft, a plurality of revolving commutators mounted at points removed from said shaft, and means for revolving said commutators in synchronism with the field, the said brushes contacting said commutators.

7. A direct current machine comprising a stationary armature, separated circuits upon said armature, a separate contact brush for each circuit terminal, a revolving shaft, a field magnet upon said shaft, a plurality of revolving commutators mounted at points removed from said shaft, means for revolving said commutators in synchronism with the field magnet, the said brushes contacting said commutators, and segments upon said commutators adapted to maintain the circuits in series and to connect predetermined ones of said brushes together during one portion of a revolution of its commutator.

8. A direct current machine comprising a revolving field magnet, a stationary armature, separated coil units upon said armature, a separate contact brush for each terminal of each unit, a revolving commutator, means for revolving said commutator, contact segments upon said commutator, conductor and resistance members connecting pre-determined ones of said segments and adapted upon a change in direction of flow of the induced current in any armature coil unit to simultaneously reverse the respective terminal brush connections of that unit whereby the armature coil units remain in a uniform polarity series during the entire operation of the machine.

9. In high potential direct current mechanism, a pre-determined number of open circuit armature coil units, and means including a commutator for maintaining said units constantly in series relationship through the commutator acting individually on each unit, said commutator maintaining all of said units in a constantly closed circuit.

10. In high potential direct current mechanism, a pre-determined number of open circuit armature coil units, and means including a commutator for maintaining said units constantly in series relationship through the commutator, acting individually on each unit, said commutator maintaining all of said units in a constantly closed circuit progressively increasing in potential from terminal to terminal of the circuit.

11. In high potential direct current mechanism, open circuit armature coil units arranged in groups, and means including a commutator for maintaining the units of each group constantly in series relationship through the commutator acting individually on each unit, said commutator maintaining all of the units of a group in a constantly closed circuit.

12. In high potential direct current mechanism, open circuit armature coil units arranged in groups, and means including a commutator for maintaining the units of each group constantly in series relationship through the commutator acting individually on each unit, said commutator maintaining all of the units of a group in a constantly closed circuit progressively increasing in potential from terminal to terminal of the circuit.

13. In high potential direct current mechanism, open circuit armature coil units arranged in groups, and means including a commutator for maintaining the units of each group constantly in series relationship through the commutator acting individually on each unit, said commutator maintaining all of the units of a group in a constantly closed circuit, each group providing an independent E. M. F. adapted to be added to the E. M. F. of other groups at will in series or in parallel or a combination of both.

14. In high potential direct current mechanism, a field magnet rotor, a commutator synchronously rotative with the rotor and arranged to individually commutate the current in each of a pre-determined number of independent coil units, a stationary open coil type armature having said coil units, said commutator maintaining each and all of said units constantly in circuit and in series relationship.

15. In high potential direct current mechanism, a field magnet rotor, a commutator synchronously rotative with the rotor and arranged to individually commutate each of a pre-determined number of independent coil units, a stationary open coil type armature having said coil units, said commutator maintaining each and all of said units constantly in circuit and in series relationship, the potential in said circuit progressively increasing from terminal to terminal of the circuit.

16. In high potential direct current mechanism, a field magnet rotor, a commutator synchronously rotative with the rotor and arranged to individually commutate each of a pre-determined number of independent coil units, a stationary open coil type armature having said coil units, said commutator maintaining each and all of said units constantly in circuit and in series relationship, a selected number of the coil units being formed of more than a single conductor.

17. In high potential direct current mechanism, a field magnet rotor, a commutator synchronously rotative with the rotor and arranged to individually commutate each of a pre-determined number of independent coil units, a stationary open coil type armature having said coil units, said commutator maintaining each and all of said units constantly in circuit and in series relationship, a selected number of the coil units being formed of more than a single conductor, said conductors of a unit having their separate terminals adapted to permit connection in series or parallel relationship or a combination of both.

18. In high potential direct current mechanism, open circuit armature coil units arranged in groups, and means including a commutating mechanism for maintaining the units of each group constantly in series relationship through the commutating mechanism acting individually on each unit, said commutating mechanism maintaining all of the units of a group in a constantly closed circuit, said commutating mechanism including a selective number of commutators, each commutator being adapted to operate in conjunction with a selective number of groups.

19. In high potential direct current mechanism, open-circuit armature coil-units having E. M. F. time values in definite phase relationship, and means including a commutator for placing units in groups with the units of each group maintained in a constantly closed circuit and having a constant series relationship, the unit E. M. F.'s of a group preserving such definite phase relationship.

20. In high potential direct current mechanism, open-circuit armature coil units having E. M. F. time values in definite phase relationship, and means including a commutator for placing units in groups with the units of each group maintained in a constantly closed circuit and having a constant series relationship, the unit E. M. F.'s of a group preserving such definite phase relationship, the commutating arrangement of the group units providing E. M. F. time values in a successive phase relationship.

21. In high potential direct current mechanism, open-circuit armature coil-units having E. M. F. time values in definite phase relationship, and means including a commutator for placing units in groups with the units of each group maintained in a constantly closed circuit and having a constant series relationship, the unit E. M. F.'s of a group preserving such definite phase relationship, the commutating arrangement of successive units of a group providing E. M. F. time values in successive phase relationship.

22. In direct current machines, an armature having a plurality of open-circuited coil-units, brushes forming terminals for said coil-units, a rotatable commutator adapted to coöperate with said brushes to place said units constantly in a closed series circuit, said commutator having individual segments connected in pairs with each coil-unit adapted to intermittently connect pairs through contact of its brushes with a segment of each of such pairs.

23. In direct current machines, an armature having a plurality of open-circuited coil-units, brushes forming terminals for said coil-units, a rotatable commutator adapted to coöperate with said brushes to place said units constantly in a closed series circuit, said commutator having individual segments connected in pairs and rendered active intermittently by contact with the terminal brushes of a coil-unit, said unit forming the connection between the pairs.

24. In direct current machines, an armature having a plurality of open-circuited coil-units, brushes forming terminals for said coil-units, a rotatable commutator adapted to coöperate with said brushes to place said units constantly in a closed series circuit, said commutator having individual segments connected in pairs and rendered active intermittently by individually contacting with the terminal brushes of a coil-unit, said unit forming the connection between the pairs.

25. In direct current machines, an armature having a plurality of open-circuited coil-units, brushes forming terminals for said units, a rotatable commutator adapted to coöperate with said brushes to place said units constantly in a closed series circuit, said commutator having individual segments arranged in circumferential rows, the segments of one row being connected with segments of other rows, the connections providing pairs of segments, a coil-unit adapted to intermittently connect segments of different pairs through contact of its brushes therewith.

26. In direct current machines, an armature having a plurality of open-circuited coil-units, brushes forming terminals for said units, a rotatable commutator adapted to coöperate with said brushes to place said units constantly in a closed series circuit, said commutator having individual segments arranged in circumferential rows, the segments of one row being connected with segments of other rows, the connections providing pairs of segments, a coil-unit adapted to intermittently connect segments of different pairs through contact of its brushes therewith, succeeding segments of the row having similar pair connections.

27. In direct current machines, an armature having a plurality of open-circuited coil-units, brushes forming terminals for said units, a rotatable commutator adapted to coöperate with said brushes to place said units constantly in a closed series circuit, said commutator having individual segments arranged in circumferential rows, the segments of one row being connected with segments of other rows, the connections providing pairs of segments, a coil-unit adapted to intermittently connect segments of different pairs through contact of its brushes therewith, succeeding segments of the row having dissimilar pair connections.

28. In direct current machines, an armature having a plurality of open-circuited coil-units, brushes forming terminals for said units, a rotatable commutator adapted to coöperate with said brushes to place said units constantly in a closed series circuit, said commutator having individual segments arranged in circumferential rows, the segments of one row being connected with segments of other rows, the connections providing pairs of segments, a coil-unit adapted to intermittently connect segments of different pairs through contact of its brushes therewith, succeeding segments of the row having dissimilar pair connections, dissimilarly connected pairs being at spaced points in the row.

29. In direct current machines, an armature having a plurality of open-circuited coil-units, brushes forming terminals for said units, a rotatable commutator adapted to coöperate with said brushes to place said units constantly in a closed series circuit, said commutator having individual segments arranged in circumferential rows, the segments of one row being connected with segments of other rows, the connections providing pairs of segments, a coil-unit adapted to intermittently connect segments of different pairs through contact of its brushes therewith, succeeding segments of the row having dissimilar pair connections, dissimilarly connected pairs being at equally spaced points in the row.

30. In direct current machines, an armature having a plurality of open-circuited coil-units, brushes forming terminals for said units, a rotatable commutator adapted to coöperate with said brushes to place said units constantly in a closed series circuit, said commutator having individual segments arranged in circumferential rows, the segments of one row being connected with segments of other rows, the connections providing pairs of segments, a coil-unit adapted to intermittently connect segments of different pairs through contact of its brushes therewith, succeeding segments of the row having dissimilar pair connections, dissimilarly connected pairs being at spaced points in the row, said points being positioned to cause the pairs to be rendered active in correspondence with the reversal of E. M. F. in the coil-unit.

31. In direct current machines, an armature having a plurality of open-circuited coil-units, brushes forming terminals for said units, a rotatable commutator adapted to coöperate with said brushes to place said units constantly in a closed series circuit, said commutator having individual segments arranged in circumferential rows, the segments of one row being connected with segments of other rows, the connections providing pairs of segments, a coil-unit adapted to intermittently connect segments of different pairs through contact of its brushes therewith, a segment of one row having its pair connection with a segment of an adjacent row.

32. In direct current machines, an armature having a plurality of open-circuited coil-units, brushes forming terminals for said units, a rotatable commutator adapted to coöperate with said brushes to place said units constantly in a closed series circuit, said commutator having individual segments arranged in circumferential rows, the segments of one row being connected with segments of other rows, the connections providing pairs of segments, a coil-unit adapted to intermittently connect segments of different pairs through contact of its brushes therewith, a segment of one row having its pair connection with a segment of an adjacent row, the succeeding segment of that row having connection with a segment of a different row.

33. In direct current machines having sources of alternating E. M. F., a rotatable commutator operative with respect to the several sources and having a plurality of segments coöperating intermittently with one of said sources to maintain said source constantly in circuit, said segments being operatively connected to the circuit solely during such periods of coöperation.

34. In direct current machines having sources of alternating E. M. F., a rotatable commutator operative with respect to the several sources and having a plurality of segments individually coöperating intermittently with one of said sources to maintain said source constantly in circuit, said segments being operatively connected to the circuit solely during such periods of coöperation.

35. In direct current machines having sources of alternating E. M. F., a rotatable commutator having a plurality of segments individually coöperating intermittently with said sources, to maintain said sources constantly in circuit, said segments being connected to provide a series relationship between predetermined sources when predetermined segments become active.

36. In direct current machines having sources of alternating E. M. F., a rotatable commutator having a plurality of segments individually coöperating intermittently with said sources to maintain said sources constantly in circuit, said segments being connected to provide a series relationship between predetermined sources when predetermined segments become active, said predetermined segments being rendered active concurrently.

37. In direct current machines having sources of alternating E. M. F., a rotatable commutator having a plurality of segments individually coöperating intermittently with said sources to maintain said sources constantly in circuit, said segments being connected to provide a series relationship between predetermined sources when predetermined segments become active, said predetermined segments being rendered active concurrently, successive segments circumferentially of the commutator becoming active in successive order.

38. In direct current machines having sources of alternating E. M. F., a rotatable commutator having a plurality of segments individually coöperating intermittently with said sources to maintain said sources constantly in circuit, said segments being connected to provide a series relationship between predetermined sources when predetermined segments become active, said predetermined segments being rendered active concurrently successive segments circumferentially of the commutator becoming active in successive order, said connections between segments being varied at points where activity of the segments is concurrent with E. M. F. reversal.

39. In direct current mechanism, a predetermined number of open-circuited sources of alternating E. M. F., a rotatable commutator for rectifying the current of said sources individually, each terminal of a source coöperating with the commutator at spaced apart points of the commutator, the commutator maintaining said sources in series relationship.

40. In direct current machines, a predetermined number of sources of alternating E. M. F. forming a group of individual sources, each source individually coöperating with a commutator, said commutator maintaining a series relationship through the group.

41. In direct current machines, a predetermined number of sources of alternating E. M. F. forming a plurality of groups of individual sources, each group having its sources individually coöperating with a commutator, said commutator maintaining a series relationship through a group.

42. In direct current machines, a predetermined number of sources of alternating E. M. F. forming a plurality of groups of individual sources, each group having its sources individually coöperating with a commutator, said commutator acting to provide a single circuit path within and through a group.

In testimony whereof I affix my signature in presence of two witnesses.

CHARLES W. GIRVIN.

Witnesses:
A. M. WILSON,
M. E. LOWRY.

Copies of this patent may be obtained for five cents each, by addressing the "Commissioner of Patents, Washington, D. C."